MELVILLE CLEMENS.  
Improvement in Universal Joint Coupling for Connecting Shafts.  
No. 125,880. Patented April 23, 1872.
3 Sheets--Sheet 2.
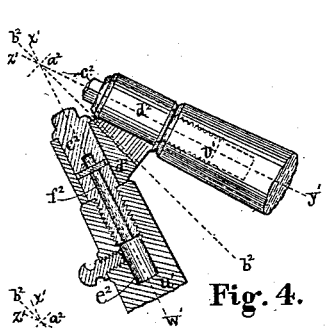
Fig. 4.
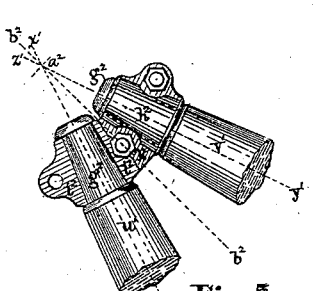
Fig. 5.
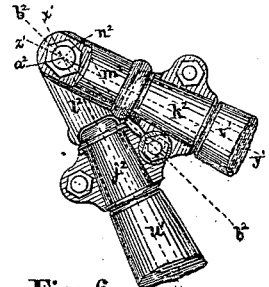
Fig. 6.
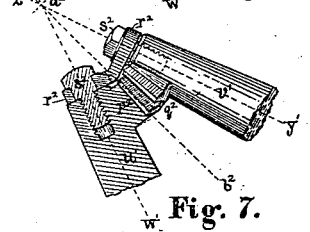
Fig. 7.
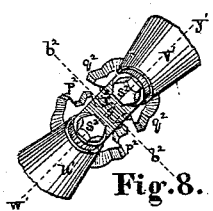
Fig. 8.
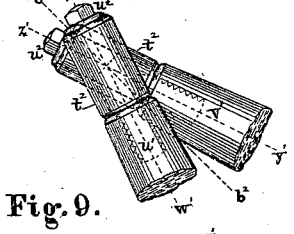
Fig. 9.
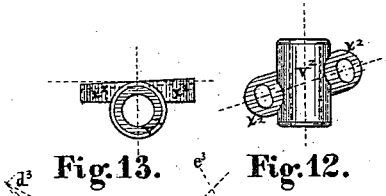
Fig. 13. Fig. 12.
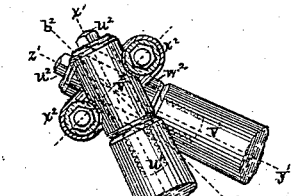
Fig. 11.
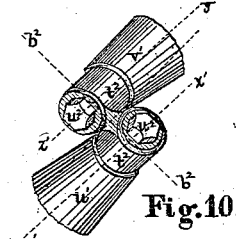
Fig. 10.
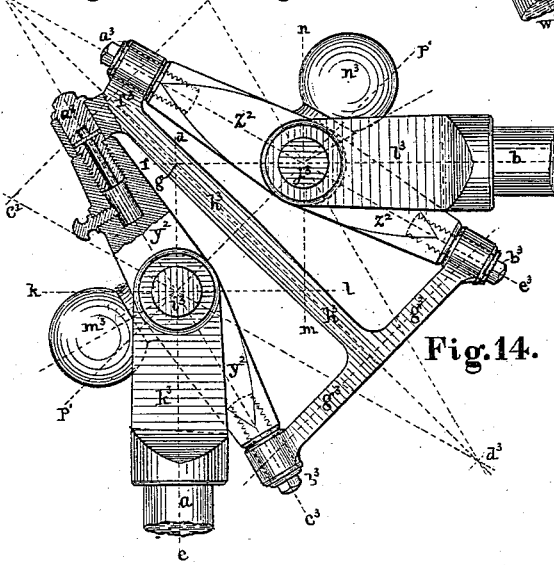
Fig. 14.
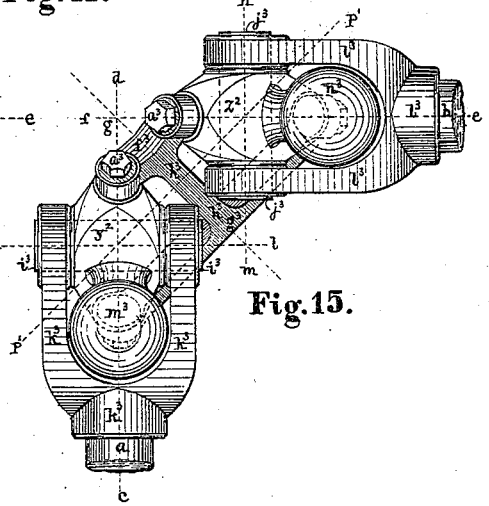
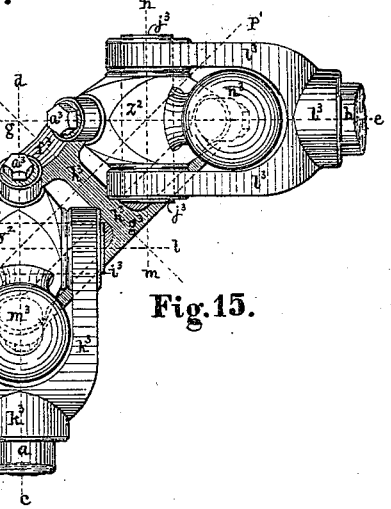
Fig. 15.
Witnesses,  
Geo. F. Clemons.  
Laura D. Clemons.
Inventor,  
Melville Clemens.

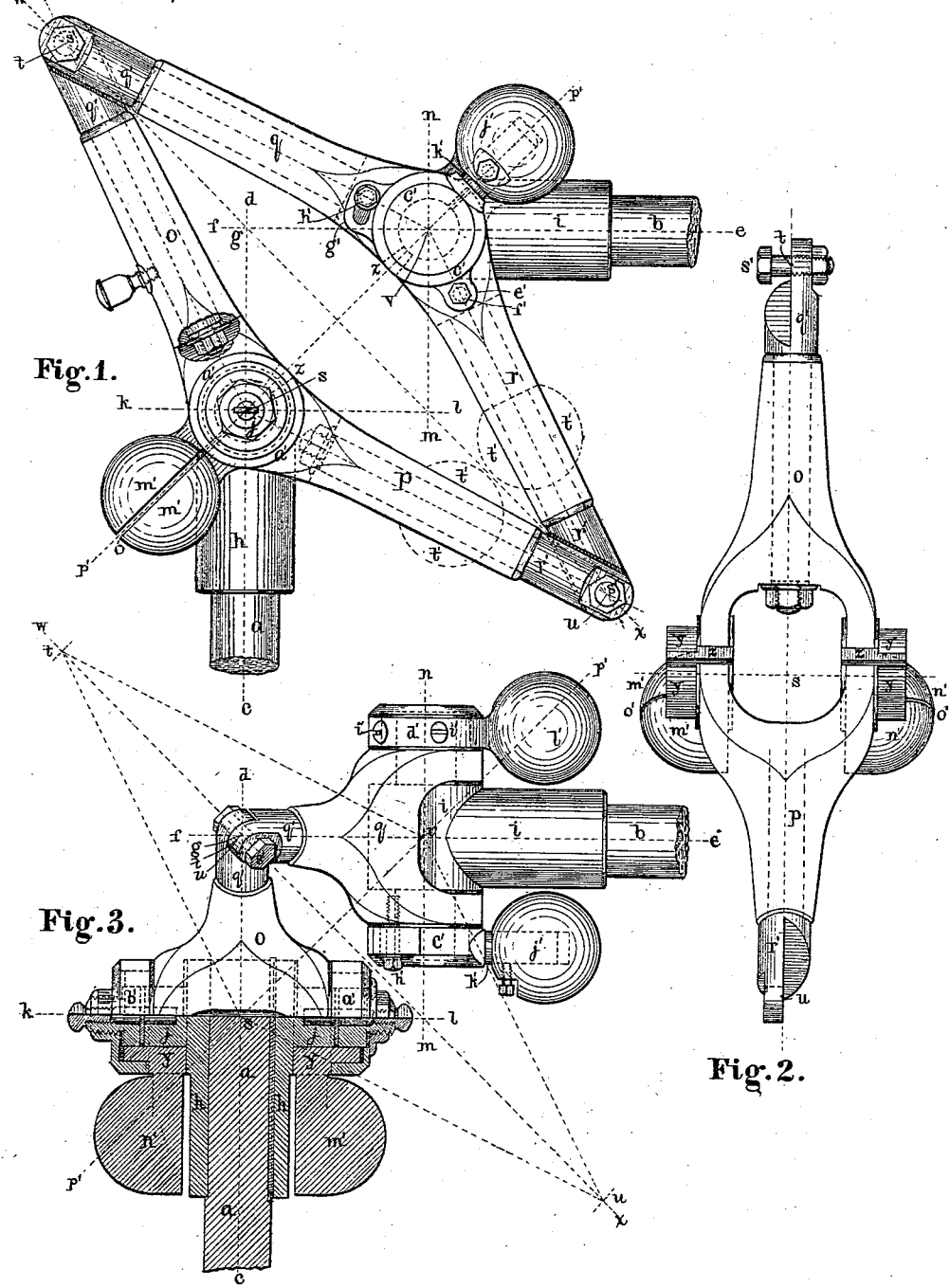

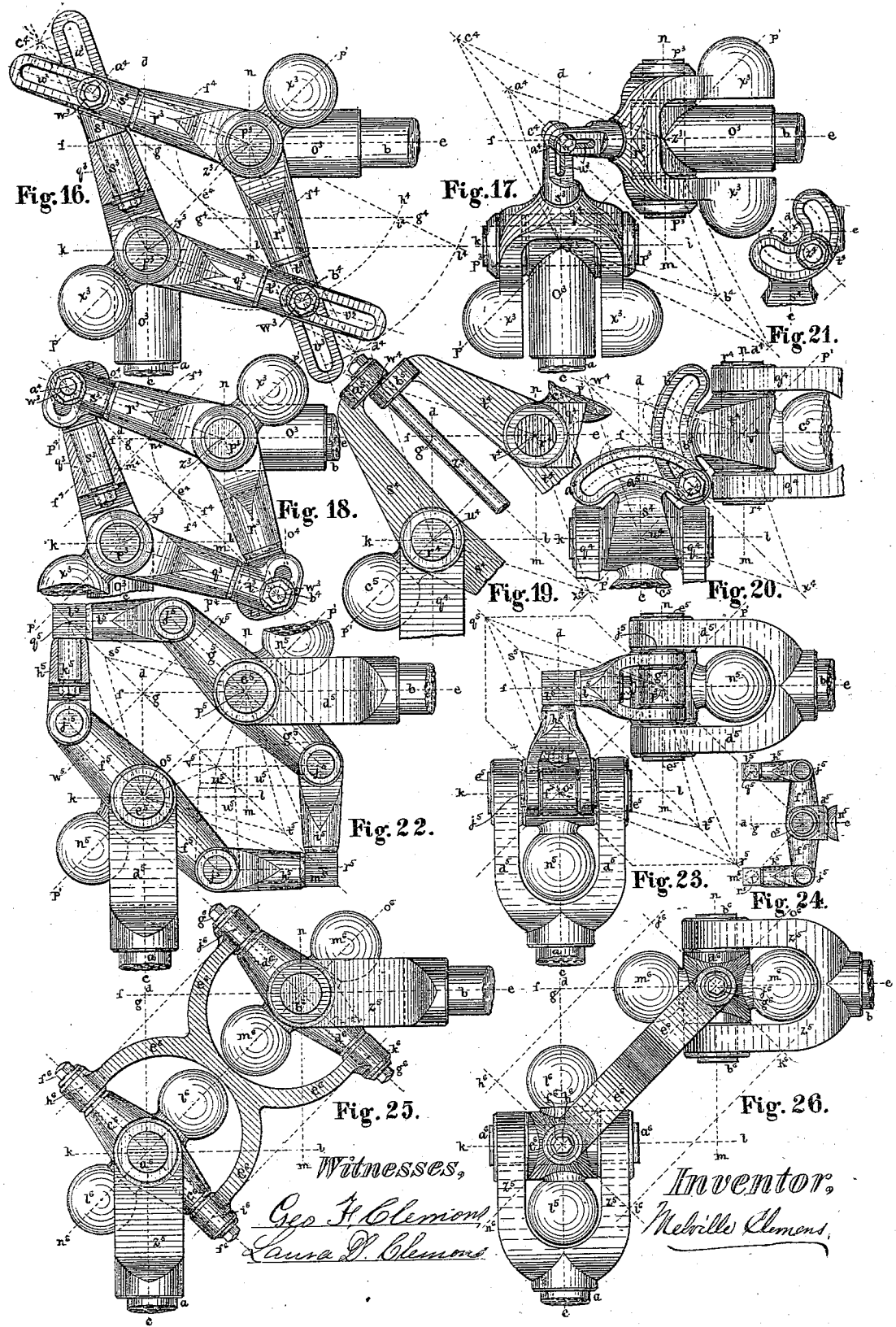

125,880

UNITED STATES PATENT OFFICE.

MELVILLE CLEMENS, OF BOSTON, MASSACHUSETTS.

IMPROVEMENT IN UNIVERSAL-JOINT COUPLINGS FOR CONNECTING SHAFTS.

Specification forming part of Letters Patent No. 125,880, dated April 23, 1872; antedated April 6, 1872.

Specification describing certain Improvements in Apparatus for Transmitting Rotary Motion, invented by MELVILLE CLEMENS, of Boston, in the county of Suffolk and State of Massachusetts.

My said invention consists in improvements upon my angular-shaft coupling, patented November 10, 1869; and it relates to new modes of construction of the coupling-arms, particularly in respect to various new manners of connecting them together and to balancing them by a new system of momentum-equalizing and balancing of rotating and vibrating bodies.

The accompanying drawing is comprised in Sheets Nos. 1, 2, and 3, and forms part of this specification. Figure 1 is a plan view of the coupling, made with two sets of straight arms, which are parted at their middle, and connected at their outer ends in pairs by hinge-jointed pins, on which they vibrate, and which are balanced by the new system of momentum-balancing weights. Fig. 2 is an inner face view of one of the sets of arms detached from its shaft. Fig. 3 is a plan view of the coupling, shown in the position of one-fourth of a revolution of the shafts from the position shown in Fig. 1. Fig. 4 shows a solid-link connection of the outer ends of one pair of the arms. Fig. 5 shows a double journal-box connection of the outer ends of the arms. Fig. 6 shows a double hinge-jointed journal-box connection of the outer ends of the arms. Figs. 7 and 8 show a combined bevel-gear and link connection of the outer ends of the arms. Figs. 9 and 10 show one arm crossing the other and a solid-link connection of them. Figs. 11, 12, and 13 show a hinge-jointed link connection of the arms crossing each other. Figs. 14 and 15 show, in the two positions given by one-fourth a revolution of the shafts, one pair of the coupling-arms, made straight and extended across their shafts, and connected at their outer ends by solid links joined by a rigid cross-bar. Figs. 16 and 17 show, in the two positions named, the coupling-arms, made double, and having their outer-end connecting-pins slotted, and sliding upon each other longitudinally, in substitution of parting the sets of arms at their middle, as in Figs. 1, 2, and 3. Fig. 18 shows a modification of the last-named plan, in which the outer-end connecting-pins are slotted at right angles instead of longitudinally to their axis-lines. Figs. 19, 20, and 21 show, in the two positions named, the coupling-arms, made double, with curved slots in heads on their outer ends, through which passes a connecting-bolt, which traverses back and forth in the slotted heads. Figs. 22, 23, and 24 show, in the two positions named, the coupling-arms, made double, and extending straight across their shafts, and having hinged at their outer ends short supplementary arms, which turn upon and are connected by link-pins solidly united by their heads at right angles to each other. Figs. 25 and 26 show, in the two positions named, a new form of construction of the common universal joint, and the application to it of my new system of momentum-balancing weights.

In all the figures of the drawing like letters refer to like parts.

The coupling shown in Figs. 1, 2, and 3 of Sheet No. 1 has the same mechanical principles of operation in its transmission of motion and power as in my coupling patented November 10, 1869; but the details of its construction, especially in respect to making the coupling-arms straight, to new modes of connecting them together and to their shafts, and to a new system of balancing them and equalizing their rotary momentum, are new and important improvements. $a$ and $b$ are two rotating shafts, suitably supported in journal-boxes and adjusted together, with their axis-lines $c\ d$ and $e\ f$ intersecting at the point $g$ at right angles in a plane supposed, for convenience, to be horizontal. In all the figures where shafts are shown the same shafts are supposed to be used, and to be similarly adjusted in a horizontal plane. On the inner ends of the shafts $a$ and $b$ are fastened like T-heads, $h$ and $i$, which are concentric with their shafts' axis-lines, and which have formed on them like pivot-pins $j\ j$, made centrally with and at right angles to their shafts' axis-lines, with their vertical planes of rotation $k\ l$ and $m\ n$ equidistant from the point $g$. The pins $j\ j$ have oil-reservoirs within them provided with suitable oil-feed holes and oil-outlet holes for self-oiling their bearing-surfaces. Upon the pivot-pins of the shaft $a$ is pivoted, at their middle, one set, $o$ and $p$, of the coupling-arms, so that they may vibrate in arcs of ninety degrees longitudinally to their shafts' axis-line, with their medial or axial lines intersecting each other in it. The shaft $b$ carries in like manner a like set, $q$ and $r$, of the coupling-arms. The four equal lines $s\ t$, $s\ u$, and $v\ t$, $v\ u$, which lie in the horizontal plane of the shafts' axes, are medial or axis-lines of the four coupling-arms, and the line $w\ x$ denotes the vertical plane in which revolve, in a true circle, the intersecting points $t$ and $u$ of the outer ends of the arms' axis-lines. In constructing these coupling-arms and connecting them to their inner-end pivots $j\ j$ each set is cast in one piece, and their inner-end journal-heads $y\ y$ are bored out to fit the pins $j\ j$ and turned up outside at their outer ends, and bands $a^1\ b^1$ or caps $c^1\ d^1$ fitted upon them to hold them together, after which they are parted through the middle of their hubs, as shown at $z\ z$. Either of the bands or the caps, or their equivalents, may be used, and all must serve to hold the parted arms together and admit of their opening and closing about sixteen degrees on their inner-end pivots. The bands $a^1$ and $b^1$ hold the inner ends of the arms $o$ and $p$ together, and they are secured in position by washer-nuts, which are screwed upon the ends of the pivot-pins $j\ j$. The caps $c^1$ and $d^1$ hold the inner ends of the arms $q$ and $r$ together. The former, $c^1$, is fixedly attached to the arm $r$ by an ear, $e^1$, and screw-bolt $f$, and loosely attached to the other arm, $q$, by the slotted ear $g^1$ and screw-bolt $h$, and the latter cap, $d^1$, is fixedly attached to the arm $q$, and loose on the arm $r$, by the screw-pins $i^1\ i^1$ passing through it into the hub of the arm $q$, each arm thus carrying one of the caps fixedly attached to it. To the cap $e^1$ is attached a balancing-weight, $j^1$, adjustable longitudinally on a spur, $k^1$, of the cap. An equal balancing weight, $l^1$, is cast upon the cap $d^1$, and equal balancing weights $m^1\ m^1$ and $n^1\ n^1$ are cast upon both the hubs of the arms $o$ and $p$, and are parted with them at $o^1\ o^1$. The weights of each set of arms are placed alike equidistant from their shafts' axis-lines, and centrally in the vertical plane $p^1\ p^1$, when in the position of a revolution, shown in Fig. 1. At their outer ends the arms are joined in pairs, $o\ q$ and $p\ r$, by like pairs of link-pins, $q^1\ q^1$ and $r^1\ r^1$. These pins are fitted in bearings in their respective arms, accurately placed, with their axis-lines coincident with the axis-lines of the arms, and secured in place by nuts and washers on their inner ends. The heads of the pins are hinge-jointed together in pairs by holding them down diagonally across to their axis-lines and lapping one upon the other, and fastening them together by pivot-bearing screw-bolts $s^1\ s^1$, which pass through them concentrically with the points $t$ and $u$, and at right angles to the planes in which the pins lie. The pins $q^1\ q^1$ and $r^1\ r^1$ may be joined by tongue-and-groove joints or by other suitable common-hinge or pivot-jointing.

When the coupling is in motion the pins $q^1\ q^1$ and $r^1\ r^1$ do not move on their connecting-bolts $s^1\ s^1$ only very slightly, and to give flexible connection of the outer ends of the arms, to free them from binding action due to faults of construction or adjustment of the coupling, and they may therefore be made fast together, but with less desirable operation. The described construction of the coupling enables the required movements of the arms the same as in my original patent—that is to say, in each revolution of the shafts $a$ and $b$, each arm vibrates on its inner-end pivot once in arcs of ninety degrees, and also vibrates on its axis and its outer-end link-pin twice in arcs of forty-five degrees in the same time. The angles of opening $s\ t\ v$ and $s\ u\ v$ of the pairs of arms $o\ q$ and $p\ r$ remain the same; but the angles of opening $t\ s\ u$ and $t\ s\ v$ of the sets of arms $o\ q$ and $p\ r$ diminish and increase about sixteen degrees in each revolution, which results from ununiform velocities of their equal inner-end pivot motions. The outer and inner end pivot-motions of the arms are equal to each other, and each is always twice the angle of divergence of the shafts. In constructing or in adjusting the couplings in position, increasing the angles of opening of the pairs of arms increases proportionably the degree of opening and closing motion of the sets of arms. These described motions of the arms of the coupling cause the opposite arms of each set to be at unequal and constantly-changing angles of inclination to or distances out from the axis-lines of their shaft, and they therefore do not balance each other, and also their united momentum is variable. In the first position of the arms, (shown in Fig. 1,) the arm $p$ has much greater momentum than the opposite arm $o$ has, and the arms are proportionably out of balance. In the second position, (shown in Fig. 3,) the arms $o$ and $p$ have each the same rotary momentum as the arm $p$ had in the first position, and they are therefore in balance, but have a combined momentum greater than they had in the first position. The system of weights employed remedies these described inequalities of balance and momentum. The weights are attached in positions as shown and described, and made heavy enough to make, in conjunction with the arms $o$ and $q$, (in the first position shown,) a counter-balance to the opposite arms $p$ and $r$. As the weights are carried by the arms to the second position (shown in Fig. 3) they are swung inward toward their shaft axes, acting in that position equally upon the arms to preserve their balance, and also with a momentum as much less than that which they had in the first position as the momentum of the arms is increased in going from the first to the second position. Thus the weights balance the arms and equalize their momentum at all points of a revolution of the coupling.

The described coupling, instead of having its sets of arms made together and parted in the middle, as described, may have each arm made separate and alike, with inner forked ends and hubs lapping upon each other and joined to the shaft T-heads, as shown in my patent of November 10, 1871.

The described coupling may be modified to a coupling with but one pair of arms by cutting off one pair of the arms (as $p$ and $r$) near their middle, and removing their pins $r^1$ $r^1$ and attaching to the arms, in substitution for the removed weight, compensating balancing-weights $t^1$ $t^1$, as shown in Fig. 1 by dotted lines. In this modification the hubs $y$ $y$ and the weights $m^1$ $m^1$ and $n^1$ $n^1$ are not parted, and the rings $a^1$ and $b^1$ and the caps $c^1$ and $d^1$, with their securing nuts and bolts, are dispensed with, and the arms are attached to their shafts' T-heads by removable pivot-pins in the place of the pins $j$ $j$.

On Sheet No. 2 of the drawing are shown various modes of connecting together the outer ends of the coupling-arms, either of which may be used in substitution of the mode described.

In Fig. 4, $u^1$ and $v^1$ are the outer portions of one pair of the coupling-arms, of which the lines $w^1$ $x^1$ and $y$ $z$ are their axis-lines, intersecting at the point $a^2$ in the line $b^2$ $b^2$, denoting its diagonal plane of rotation. In the outer ends of the arms are fixed, centrally with the arms' axial lines, like pivot-pins $c^2$ $c^2$, which turn in bearings formed in a solid link, $d^2$. The arm $u^1$ and one pin and half the link are shown in center section, to illustrate their connection and a mode of self-oiling the pin-bearings. An oil-reservoir, $e^2$, in the arm has an oil feed-hole, stopped by a removable plug, and leading by a longitudinal hole, $f^2$, in the pin to outlet-holes made transversely across the pin, and plugged with rattan or other porous material.

In Fig. 5 the arms $u^1$ and $v^1$ have formed upon their projecting ends conical journal-pins and heads $g^2$ $g^2$, which are fitted to turn in bearings of a double journal-box link made in two equal halves, $h^2$ and $i^2$, and bolted together. Part of the upper half $h^2$ is broken away to show one of the journal-pins $g^2$.

In Fig. 6 the arms $u^1$ and $v^1$ have journal-pins, like $g^2$ $g^2$, fitted to turn in journal-boxes $j^2$ and $k^2$. The lower half of $j^2$ and the upper half of $k^2$ are alike extended parallel to their shafts' axes by like projections $l^2$ and $m^2$, which are hinge-jointed together by a bolt, $n^2$, passing through them centrally with the intersecting points $a^2$ of their arms' axis-lines, and at right angles to their planes. A middle screw-bolt, $o^2$, aids to holds the box-caps to their boxes, and admits of slight opening and closing of the arms to free their movements by passing through slotted half-holes formed in the contiguous edges of the boxes.

In Figs. 7 and 8 are two views showing the arms $u^1$ and $v^1$, having formed upon or attached to their outer ends like segments of bevel-gears $p^2$ and $q^2$, which mesh together and roll back and forth upon each other as the arms vibrate upon their axis-lines when in motion. A link, $r^2$, and pivot-pins $s^2$ $s^2$, which pass through it, and are fixed centrally in the ends of the arms, serve to hold the arms and gears in true positions.

In Figs. 9 and 10 are two views, showing the arms $u^1$ and $v^1$ made to cross each other, one in advance of the other, and joined together by a solid link, $t^2$, which has journal-pin holes through it, in which are fitted to turn pivot-pins $u^2$ $u^2$ fastened in the arms centrally with their axis-lines.

In Figs. 11, 12, and 13 is shown a connection of the arms $u^1$ and $v^1$, similar to the last-described one, but differing in making the link in two like halves or boxes $v^2$ and $w^2$ and joining them by screw-bolts passing through circular-slotted holes in projecting ears $x^2$ $x^2$ of the boxes, so as to admit of slight opening and closing of the arms by the boxes swiveling upon each other to free the arms' movements.

The two arm-connections last described in Figs. 9 to 13 can only be used with one pair of arms in the coupling, and the coupled shafts will not revolve exactly uniformly equal.

In Figs. 14 and 15 are views, in the two positions of a revolution before named, of the coupling, having but one pair of arms, $y^2$ and $z^2$, which are extended straight across their shafts $a$ and $b$, and which are connected alike at both their outer ends by like pivot-pins $a^3$ $a^3$ and $b^3$ $b^3$, fixed in their ends concentrically with their arms' converging axis-lines $c^3$ $d^3$ and $e^3$ $d^3$, and turning in bearings in two solid links, $f^3$ and $g^3$, which are rigidly joined by a cross-bar $h^3$. The arms are carried at their middles on pivot-pins $i^3$ and $j^3$, in forked heads $k^3$ and $l^3$ on the shafts $a$ and $b$, and they have like balancing-weights $m^2$ and $n^3$ attached to them, which weights, for the best effect of balancing the arms and their appendages in their combination, are placed centrally on the middle of the arms, in lines at right angles to the axis-lines of the arms, as shown. The intersecting point $d^3$ of the axis-lines of the arms revolves in a true circle, $d^3$ $d^3$, and in each revolution of the shafts $a$ and $b$ the arms vibrate once in arcs of ninety degrees on their middle pivot-pins, and also twice in arcs of forty-five degrees on their axis-lines and their outer-end pivots. In the use of one pair of arms, before descibed and shown in modification of Fig. 1, the single pair of arms and their middle weights may be adapted to be carried in forked heads, like the arms $y^2$ and $z^2$.

On Sheet No. 3, in Figs. 16 to 24 inclusive, are shown modifications of the coupling shown in Figs. 1, 2, and 3, whose chief features of difference from it are in making the coupling-arms double and continuous, instead of in sets and parted at their middle, and in substituting for the described provisions for the opening and closing movements between the sets of arms at their middle, compensating, self-adjustable connections of their outer ends, which give like resultant opening and closing movements between the pairs of arms at their outer ends. In all the modifications the axis-lines of the arms converge together and intersect each other in a medial-diagonal plane of rotation of their intersecting points, in which plane motion and power is transmitted from the appendages of one shaft to those of the other shaft, substantially the same as in the coupling shown in Figs. 1, 2, and 3, and in my original shaft-coupling.

In Figs. 16 and 17 is shown one of the modifications of the coupling in the two before-named positions of a revolution. The shafts $a$ and $b$ carry, on T-heads $o^3$ $o^3$ and removable pivot-pins $p^3$ $p^3$, the double arms $q^3$ and $r^3$, joined at their outer ends by like link-pins $s^3$ $s^3$ and $t^3$ $t^3$, adjusted and turning in their arms' ends like the link-pins $q^1$ $q^1$ and $r^1$ $r^1$ in Figs. 1, 2, and 3, and hinge-jointed together in pairs like them, but with the addition of longitudinally-slotted holes $u^3$ $u^3$ and $v^3$ $v^3$ in them, through which pass their connecting pivot-pins $w^3$ $w^3$. These pins may be provided with band-rollers upon them, fitting and rolling in the slots, to diminish friction. As the pairs of arms are revolved and vibrate upon their middle and their outer-end pivots, the connected links slide back and forth upon each other, and the connecting-pins $w^3$ $w^3$ traverse back and forth in the slots, from end to end, twice in each revolution. The arms and their appendages are balanced by like weights $x^3$ $x^3$ $x^3$ $x^3$, attached alike to the arms, and operating substantially as before described. In the first position of the coupling, (shown in Fig. 16,) $y^3$ $a^4$ $z^3$ and $y^3$ $b^4$ $z^3$ are the angles of opening of the axis-lines of the two pairs of arms, and $y^3$ $c^4$ $z^3$ and $y^3$ $d^4$ $z^3$ their angles of opening in the second position, (shown in Fig. 17.) The difference in these angles measures the degree of opening and closing movements of the pairs of arms. The required length of the slots $u^3$ $u^3$ and $v^3$ $v^3$ is found mechanically in Fig. 16, as follows, viz.: Draw from the center $z^3$, with a radius, $z^3$ $c^4$, the circle $f^4$ $f^4$, and draw, also, the line $g^4$ $g^4$ tangent to it and parallel to $f$ $e$ or $k$ $l$. From $z^3$, as a center, with a radius $z^3$ $b^4$ or $z^3$ $a^4$, draw the circle $h^4$ $h^4$, cutting the line $g^4$ $g^4$ at $i^4$. Through the points $z^3$ and $i^4$ draw a line cutting the extended line $k$ $l$ at $l^4$. The distance $i^4$ $l^4$ is the required length of each slot.

In Fig. 18 is shown the same combination as in Figs. 16 and 17, excepting in the slotting of the link-pins, which in Fig. 18 are slotted in curved lines $a^4$ $o^4$ $b^4$ $o^4$ and $a^4$ $p^4$ $b^4$ $p^4$, which are, respectively, tangent to the arms' axis-lines $y^3$ $a^4$ $y^3$ $b^4$ and $z^3$ $a^4$ $z^3$ $b^4$. To determine the required length of the slots mechanically, draw from the centers $z^3$ and $y^3$, with a radius $z^3$ $c^4$, the circles $f^4$ $f^4$, cutting the axis-lines of the shafts at $m^4$ and $n^4$. Half the distance $m^4$ $n^4$ is the required length of each slot. The arms and weights of the two last-described couplings may be carried in forked heads, like the arms $y^2$ and $z^2$ in Figs. 14 and 15, instead of on the T-heads $o^4$ $o^4$.

In Figs. 19 and 20 is shown another modification of the coupling in the two before-named positions of a revolution. The shafts $a$ and $b$ carry, in forked heads $q^4$ $q^4$ on pivot-pins $r^4$ $r^4$, the double arms $s^4$ and $t^4$, which are connected in pairs at the intersections of the outer ends of their equal axis-lines $u^4$ $w^4$ $v^4$ $w^4$ and $u^4$ $x^4$ $v^4$ $y^4$ by a rod, $z^4$, which passes through like curved slots formed in curved heads $a^5$ $a^5$ and $b^5$ $b^5$ on the two outer ends of both the arms. As the arms are revolved and vibrate on their middle pivots and their axis-lines, the rod $z^4$ traverses back and forth from end to end of the slots once in each revolution, and at the same time it revolves at uniform velocity in the diagonal plane of the circle $w^4$ $x^4$. The rod $z^4$ may be provided with band-rollers upon it, fitting and rolling in the slots, to diminish friction. $c^5$ $c^5$ are like balancing-weights, attached to the arms, and operating as before described.

Fig. 20 shows the position, length, and curvature of the slots in the arms' heads. Their center lines, on the contiguous faces of the heads, cut the intersecting points of the arms' axis-lines by curves drawn with radiuses equal to one-half the distance $u^4$ $v^4$, and extend, through arcs of forty-five degrees, equally on both sides of the medial plane of the arms.

In Fig. 21 is shown a reverse curving of the slots and heads of the arms, which may be used in substitution of that just described of Figs. 19 and 20. Their positions, in the face combination of the coupling, are shown by the dotted curved lines centering at the point $g$ in Fig. 20.

In Figs. 22 and 23 is shown another modification of the coupling in the two before-named positions of a revolution. The shafts $a$ and $b$ carry, in forked heads $d^5$ $d^5$ on pivot-pins $e^5$ $e^5$, the like double arms $f^5$ and $g^5$, which are extended by like supplementary arms $h^5$ $h^5$ and $i^5$ $i^5$, which have inner forked ends pivoted upon pivot-pins $j^5$ $j^5$, made fast in the ends of the arms, and which are united in pairs by like link-pins $k^5$ $k^5$ $k^5$ $k^5$ rigidly connected in pairs, at right angles to each other, by solid heads $l^5$ and $m^5$, and fitted to turn in bearings formed longitudinally in the supplementary arms' centers. $n^5$ $n^5$ are like balancing-weights, attached to the middle of the arms, and operating as before described.

In the position shown in Fig. 22 the lines $o^5$ $l^5$ and $o^5$ $m^5$, and the equal lines $p^5$ $l^5$ and $p^5$ $m^5$, are the true axis-lines of the arms, and the equal angles $o^5$ $l^5$ $p^5$ and $o^5$ $m^5$ $p^5$ are the angles of opening of the two pairs of arms.

In revolving the coupling to the second position (shown in Fig. 23) the axis-lines of the arms change to the lines $o^5$ $s^5$ and $o^5$ $t^5$ and the equal lines $p^5$ $s^5$ and $p^5$ $t^5$, and the angles of opening of the two pairs of arms change to the equal angles $o^5$ $s^5$ $p^5$ and $o^5$ $t^5$ $p^5$.

In the last-named position the supplementary arms are horizontally at right angles to the arms carrying them, as shown in Fig. 24.

The supplementary arms of each double arm may be made to revolve with their centers preserved in parallel lines to each other, as shown by the dotted lines $u^5$ $u^5$, for which purpose suitable parallel-rod connections of them may be made to guide them parallel to each other.

When the supplementary arms move parallel, as aforesaid, the intersecting points of the outer ends of the arms' axis-lines will revolve in a true circle, whose diameter is the line $l^5 v^5$, whose center is the point $g$, and whose axis of rotation is the line $w^5 x^5$.

In this modification, each supplementary arm would make one complete revolution upon its outer end pivot-pin, at each revolution of the shafts $a$ and $b$, instead of, as before, making two vibrations in arcs of ninety degrees upon those pivots; and they would at the same time vibrate once in arcs of ninety degrees on their inner end pivot-pins $j^5 j^5$, instead of, as before, making two vibrations in arcs of forty-five degrees.

In Figs. 25 and 26 is shown in the two positions of a revolution before named, a modified form of construction of the common, double, universal joint, with my system of momentum-equalizing weights adapted to it to remedy its inequalities of momentum.

The shafts $a$ and $b$ carry in forked heads $z^5 z^5$ on pivot-pins $a^6 a^6$, the double arms $c^6$ and $d^6$, which are connected alike at their outer ends to a double forked bar, $e^6$, by pivot-pins $f^6 f^6$ and $g^6 g^6$, which turn in bearings in the ends of the forks, and are made fast in the ends of the arms, concentric with their axis-lines $h^6 i^6$ and $j^6 k^6$. $l^6 l^6$ and $m^6 m^6$ are like weights, attached alike to opposite sides of the arms at right angles to their axis-lines, and to the axis-lines of the pivot-pins $a^6$ and $b^6$.

Similarly, as is known of the common double universal joint, when the shafts $a$ and $b$ are revolved at uniform velocities the forked bar $e^6$ will revolve in the second position, shown in Fig. 26, with twice its velocity in the first position, shown in Fig. 25, it having but half the momentum in the latter position that it had in the former position. The double arms $c^6$ and $d^6$, corresponding to the balls, disks, or rings commonly used to connect the forks, also have in the first position named, a rotary momentum less than that they have in the second position named, nearly as seven is to ten. The weights $l^6 l^6$ and $m^6 m^6$ are employed to equalize these varying momentums of the double forks and double arms. In the first position they are swung outward from their axes of rotation (their shaft's axes) and in going to the second position they are swung inward, and lie centrally in their axes of rotation; and consequently they have greatly less rotary momentum in the second than in the first position. Hence, by suitably proportioning the weights, their difference of rotary momentum may be made equal to the difference of rotary momentum of the double arms and double forks, so that the increasing momentum of the one will counterbalance the decreasing momentum of the other throughout their revolution, producing thereby uniform rotary momentum of the apparatus.

The described system of balancing and momentum-equalizing weights is applicable to various kinds of mechanism other than that shown, for the purposes of balancing and equalizing the momentum of their parts, which have similar rotating and vibrating motions.

I claim as my invention—

1. The two pairs of like shaft-coupling arms $o\ q$ and $p\ r$, connected in sets at their inner ends to the coupled shafts, and connected together in pairs at their outer ends, so as to operate substantially as set forth.

2. The one pair of like shaft-coupling arms $o\ q$, connected together at their outer ends, and to their shafts so as to operate substantially as set forth; and I claim, further, their extension across their shafts with balancing weights $t^1 t^1$ on their extended ends, substantially as set forth.

3. Constructing and parting the sets of shaft-coupling arms $o\ p$ and $q\ r$ at their middle, and joining them together and to their shaft-pivots by bands $a^1$ or $b^1$, or by $c^1$ or $d^1$, substantially as set forth.

4. The pairs of link-pins $q^1 q^1$ and $r^1 r^1$, employed to connect the outer ends of the shaft-coupling arms, substantially as set forth.

5. The balancing weights $j^1$, $l^1$, $m^1$, and $n^1$, employed substantially as and for the purposes set forth.

6. The solid link connection of the outer ends of the shaft-coupling arms, shown in Fig. 4 of the drawing, substantially as and for the purposes set forth.

7. The double journal-box connection of the outer ends of the shaft-coupling arms, shown in Fig. 5 of the drawing, substantially as and for the purposes set forth.

8. The double hinge-jointed journal-box connection of the outer ends of the shaft-coupling arms, shown in Fig. 6 of the drawing, substantially as and for the purposes set forth.

9. The combined bevel-gear and link-connection of the outer ends of the shaft-coupling arms, shown in Figs. 7 and 8 of the drawing, substantially as and for the purposes set forth.

10. The solid link-connection of the outer ends of the shaft-coupling arms, shown in Figs. 9 and 10 of the drawing, substantially as and for the purposes set forth.

11. The hinge-jointed link-connection of the outer ends of the shaft-coupling arms, shown in Figs. 11, 12, and 13 of the drawing, substantially as and for the purposes set forth.

12. The shaft-coupling arms $y^2 z^2$, extending straight across their shafts in converging axis-lines, and connected at their outer ends by the solid links $g^3$ and $f^3$ and bar $h^3$, and connected to their shafts, and having balancing weights $m^3$ and $n^3$ attached, substantially as set forth.

13. The double shaft-coupling arms $q^3$ and $r^3$, connected at their outer ends by the slotted link-pins $s^3 s^3$ and $t^3 t^3$, and adapted in combination, substantially as and for the purposes set forth.

14. The double shaft-coupling arms $s^4$ and $t^4$, connected at their outer ends by the curved slotted heads $a^5$ and $b^5$ and the rod $z^4$, and adapted in combination, substantially as and for the purposes set forth.

15. The double shaft-coupling arms $f^5$ $g^5$, extended by the supplementary arms $h^5$ $h^5$ and $i^5$ $i^5$, and connected together at their outer ends by the link-pins $k^5$ $k^5$ and $k^5$ $k^5$, and adapted in combination, substantially as and for the purposes set forth.

16. The balancing and momentum-equalizing weights $l^6$ $l^6$ and $m^6$ $m^6$, employed to equalize the momentum of the common universal joint, or other similar rotating and vibrating parts of mechanism, substantially as set forth.

MELVILLE CLEMENS.

Witnesses:
GEO. F. CLEMONS,
LAURA D. CLEMONS.